Dec. 29, 1953  R. L. MARTIN  2,664,066
CAPACITOR COATING MACHINE
Filed May 1, 1951  5 Sheets-Sheet 1
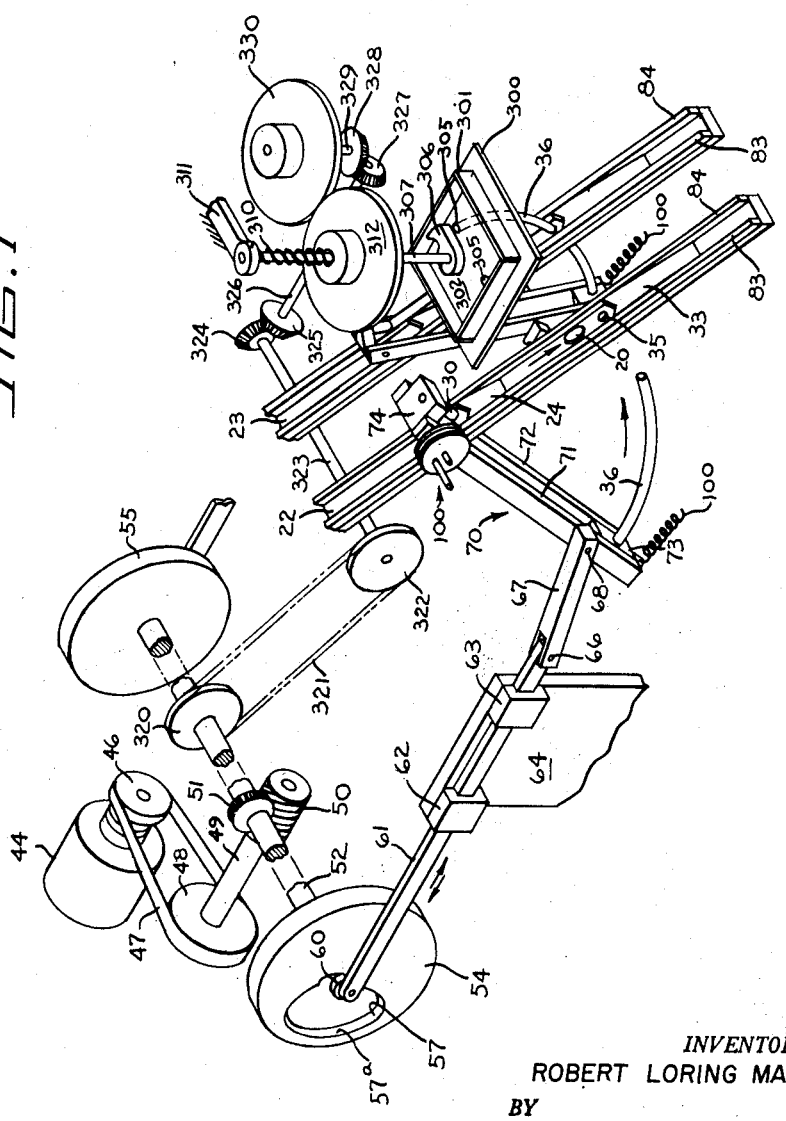
INVENTOR.
ROBERT LORING MARTIN
BY
Ostrolenk & Faber
ATTORNEYS Dec. 29, 1953  R. L. MARTIN  2,664,066
CAPACITOR COATING MACHINE
Filed May 1, 1951  5 Sheets-Sheet 2
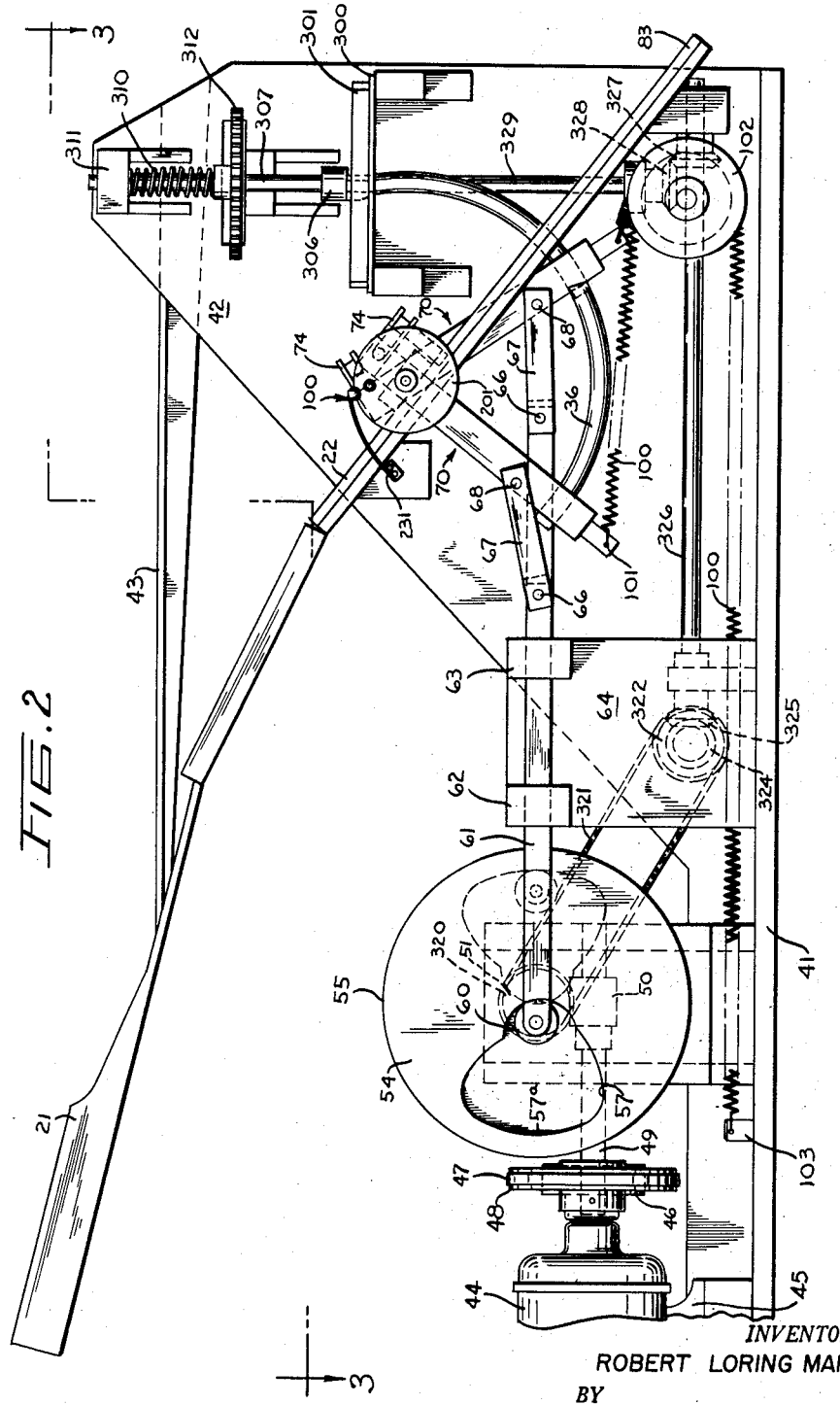
INVENTOR.
ROBERT LORING MARTIN
BY
Ostrolenk & Faber
ATTORNEYS Dec. 29, 1953   R. L. MARTIN   2,664,066
CAPACITOR COATING MACHINE
Filed May 1, 1951   5 Sheets-Sheet 3
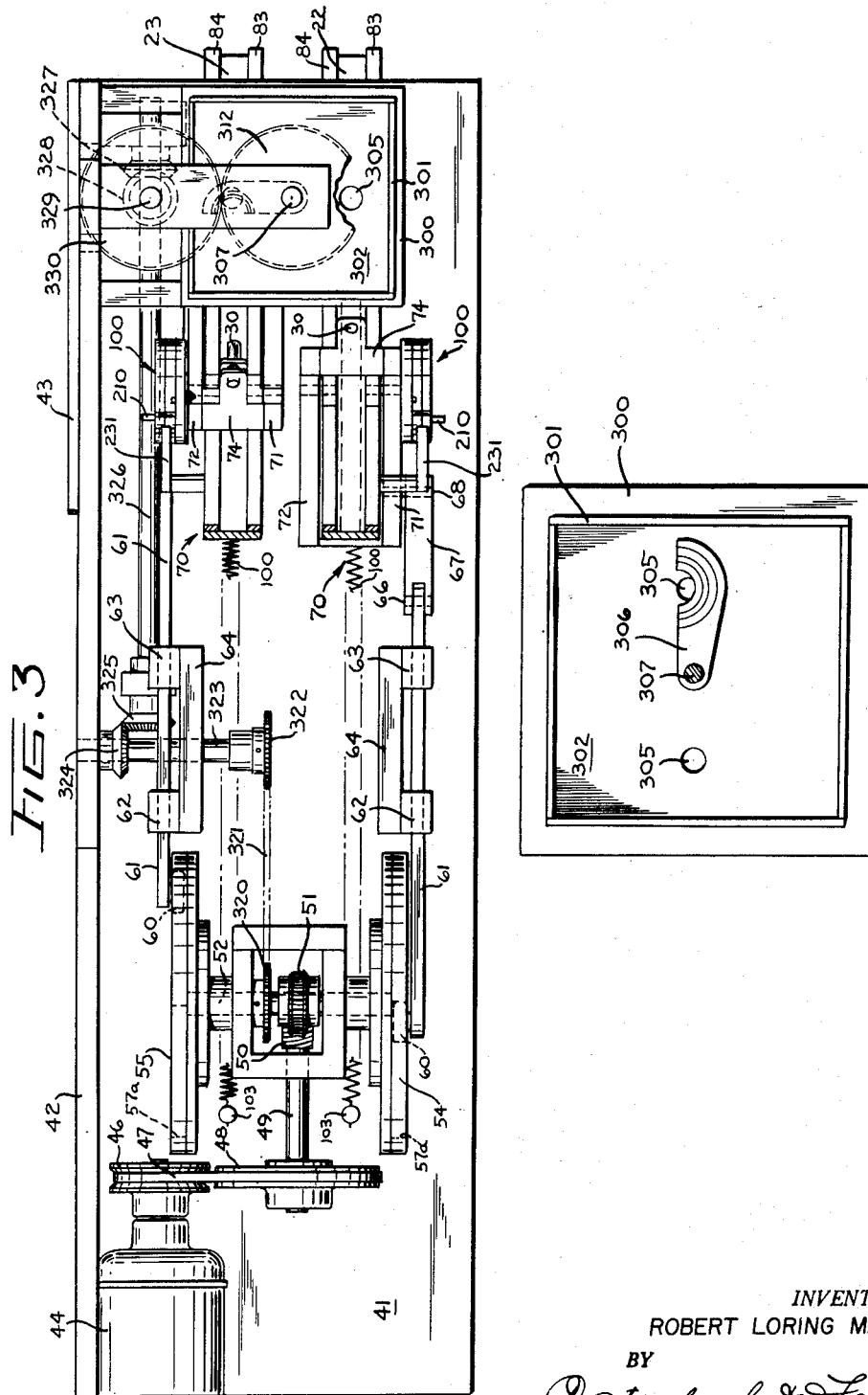
INVENTOR.
ROBERT LORING MARTIN
BY
Ostrolenk & Faber
ATTORNEYS Dec. 29, 1953 R. L. MARTIN 2,664,066
CAPACITOR COATING MACHINE
Filed May 1, 1951 5 Sheets-Sheet 4

INVENTOR.
ROBERT LORING MARTIN
BY
Ostrolenk & Faber
ATTORNEYS

Dec. 29, 1953  R. L. MARTIN  2,664,066
CAPACITOR COATING MACHINE
Filed May 1, 1951  5 Sheets-Sheet 5
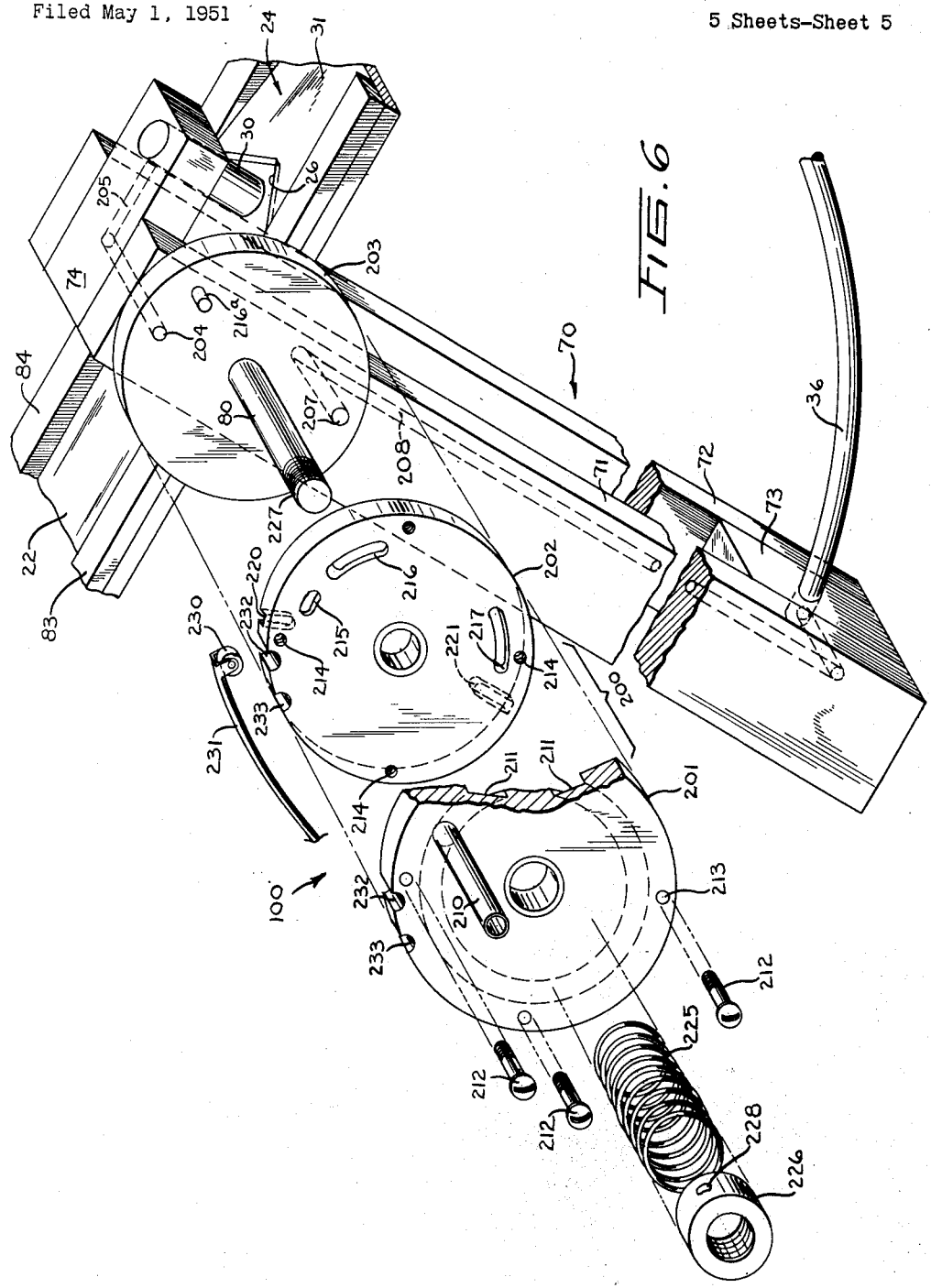
INVENTOR.
ROBERT LORING MARTIN
BY
Ostrolenk & Faber
ATTORNEYS

Patented Dec. 29, 1953

2,664,066

UNITED STATES PATENT OFFICE 2,664,066

CAPACITOR COATING MACHINE

Robert Loring Martin, Whittier, Calif., assignor to Solar Manufacturing Corporation, Los Angeles, Calif., a corporation of New York Application May 1, 1951, Serial No. 223,883

20 Claims. (Cl. 118—213)

My present invention is an improvement of the capacitor coating machine shown and described in application Serial No. 215,349 filed March 13, 1951, and relates more particularly to apparatus for coating a series of successive insulating discs with conductive material in order to produce a plurality of capacitors.

In the application above mentioned, the basic principle of operation was the movement of successive discs by gravity down a track where each disc was first halted at a loading step, then removed from the loading step and halted once more at an indexing step, then lifted at the indexing position into engagement with a fountain brush arrangement which applied the coating material to the disc and thereafter dropped past the indexing step on the track to a delivery point.

In addition, an arrangement was therein provided wherein two such machines used in tandem were connected by a specific conveyor system and inverting mechanism which provided means for automatically coating both sides of the discs in succession and then drying them in order to produce the final coated disc type capacitor.

The removal of the disc from the loading step in each instance was accomplished by a hollow spindle in which a controlled vacuum in the spindle permitted the spindle to pick up the disc, and shutting off of the vacuum or opening the interior of the spindle to the atmosphere permitted the disc to drop off past the loading step of the track.

Thereafter the lifting of the disc at the indexing step was accomplished also by a hollow spindle having an internal vacuum which permitted the spindle positively to retain the disc in position while it was lifted into engagement with the fountain brush.

The spindle at the indexing step was also so arranged that while the disc carried thereby was in engagement with the fountain brush, it could be rotated in order to ensure an even deposit of the metallic coating material intended to form the electrode.

My present invention has for its object the provision of novel simplified apparatus of a similar type wherein, however, the number of moving parts is not only reduced but also the entire series of operations is greatly simplified and a single coating mechanism may operate on a plurality of tracks in order at least to double the capacity of the machine.

Essentially, instead of utilizing a fountain brush and an indexing spindle which is required to rotate, my invention utilizes a screen and squeegee, the squeegee being used to pass the coating material through appropriate openings in the screen and the indexing spindle being arranged to bring the disc to be coated up to the appropriate opening in the screen at the time the squeegee passes said opening.

By this means therefore, a continuously rotating squeegee may be used in timed relation to the spindle so that the squeegee passes the opening as the index spindle brings the disc up to the opening to be coated. Consequently rotation of the indexing spindle is no longer required and intermittent motion of rotary parts is obviated and the squeegee element may nevertheless rotate continuously while the disc itself is held stationary during the coating operation.

Thus, another object of my invention is the utilization of a screen printing method for depositing appropriate coating material on an insulating disc in order to form a capacitor, said screen printing method being utilized in connection with automatic feed and removal apparatus operating in timed relation with the squeegee of the screen printing apparatus.

Also, the apparatus of my invention is so arranged that the loading spindle and the indexing spindle may be driven simultaneously and actually may be carried by the same yoke or oscillating mounting unit so that the timed relation between the loading spindle and the indexing spindle is fixed by the integration of these units owing to the fact that they are carried by the same oscillating unit.

Thus special apparatus for driving each of the loading and indexing spindles and special set-ups for maintaining the timed relation between the units is made unnecessary—the timing of these units with respect to each other being determined by the distance of the ends of each of the loading spindle and index spindle from the center of oscillation of the entire mounting member which carries both these units.

In addition, the utilization of a screen and squeegee located above the indexing spindle makes it possible to use at least two parallel spindles operable alternately with respect to a pair of parallel tracks in order at least to double the capacity of the machine. That is, while one set of spindles is going through a loading operation, the second set of spindles on the second track may be going through the actual printing operation. This is obtained by placing printing holes or openings in the screen 180° apart and arranging the spindles so that they operate alternately in timed relation to the position of the squeegee above the holes of the screen.

Under appropriate conditions with appropriate locations of the openings in the screen and appropriate dimensioning of the squeegee with respect to the width of the track, three, four or more tracks may be used in connection with as many sets of spindles; also in connection with as many equally angularly spaced holes or openings in the printing screen.

Thus another object of my invention is the provision of means for substantially simultaneous coating of a plurality of sets of discs operating on separate tracks at the same time.

In addition, the silk screen printing art is so well advanced that by appropriate arrangement of the squeegee, appropriate arrangement of the printing holes in the screen, and appropriate control of the consistency of the metallic material to be deposited through the screen, accurate control of the thickness of the coating deposited may be maintained so that the capacitors formed by this means come more nearly within a uniform capacity range.

Thus my present machine is adapted primarily to the formation of capacitors wherein a narrow capacity range for the entire run of units is required. Prior automatic capacitor coating machines have to a great extent been used only where a relatively wide range of capacities are required.

The capacitors completed by these coating machines have then been passed through automatic sorting units which automatically tested each capacitor for its actual capacitance and sorted the successive capacitors into groups of identical capacity.

By the utilization of my present novel apparatus with extremely close control of the thickness of the coating to be deposited, a desired run of one capacity condenser will fall so well within the tolerance range for that particular capacity that sorting of the units produced thereby into separate groups for different capacitances will no longer be necessary.

Essentially my machine contemplates the utilization of a pair of parallel cams arranged coaxially but 180° displaced from each other, each cam operating a single yoke unit including a loading spindle and indexing spindle, the 180° displacement of the two cams causing the two yoke units to operate alternately.

The squeegee is rotated continuously and thus alternately comes into contact with the disc carried by the indexing spindle on each side as the disc carried by the said spindle engages the opening of the screen on that side.

Delivery is automatic since after the disc has been coated, the closing off of the vacuum in the indexing spindle and the venting of the same to the atmosphere will permit the disc to drop off past the index step and down the track.

In addition my novel apparatus may be used in tandem with a second identical piece of apparatus as shown in the aforementioned application for completing the coating of both sides of the discs.

Further, since two parallel tracks are used, my novel apparatus may be utilized with two hoppers rather than one hopper wherein the second hopper is loaded by hand or automatically from a conveyor connected to the delivery of the track for the first hopper with discs which have been coated on one side.

In addition, an inverting conveyor of the type suggested in the aforesaid application may be utilized to load the second track with discs coated on one side so that a single machine may be used for coating both sides of the disc.

My invention also contemplates the utilization of a novel simplified valve mechanism controlled by the oscillation of the yoke carrying the indexing and loading spindles to control the admission of air and the drawing of a vacuum in each of the spindles in timed relation to the position of the spindles.

The foregoing and many other objects of my invention will become apparent in the following detailed description taken in connection with the accompanying drawings in which:

Figure 1 is a general schematic view illustrating the operation of my invention.

Figure 2 is a side view of my novel machine. Most of the description herein will be directed to Figures 1 and 2 since together they illustrate substantially the entire operation of my novel device.

Figure 3 is a top plan view of my novel machine.

Figure 6 is an exploded view in perspective of the valve elements showing the manner in which air is admitted to the loading spindle and the indexing spindle.

Figure 7 is a top plan view, partly in cross-section, showing the screen and squeegee arrangement.

Referring first to Figures 1 and 2, the discs 20 to be coated are pushed in any suitable manner from the hopper 21, not shown in Figure 1 but shown in Figure 2, down the pair of parallel tracks 22, 23. Each of the discs 20 comes to a halt at the loading step 24 on each of the tracks 22 and 23.

Figure 5:
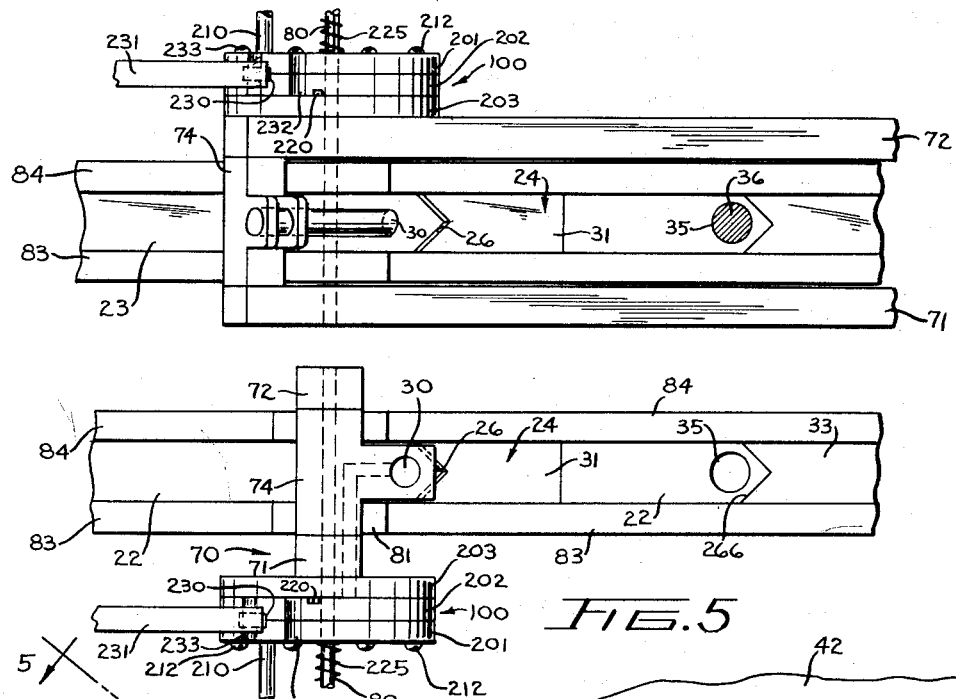
Figure 5 is a top plan view, partly in cross-section, taken on line 5—5 of Figure 4, and showing the arrangement of the two tracks and the indexing apparatus therefor as well as the location of the valves.
Figure 4:
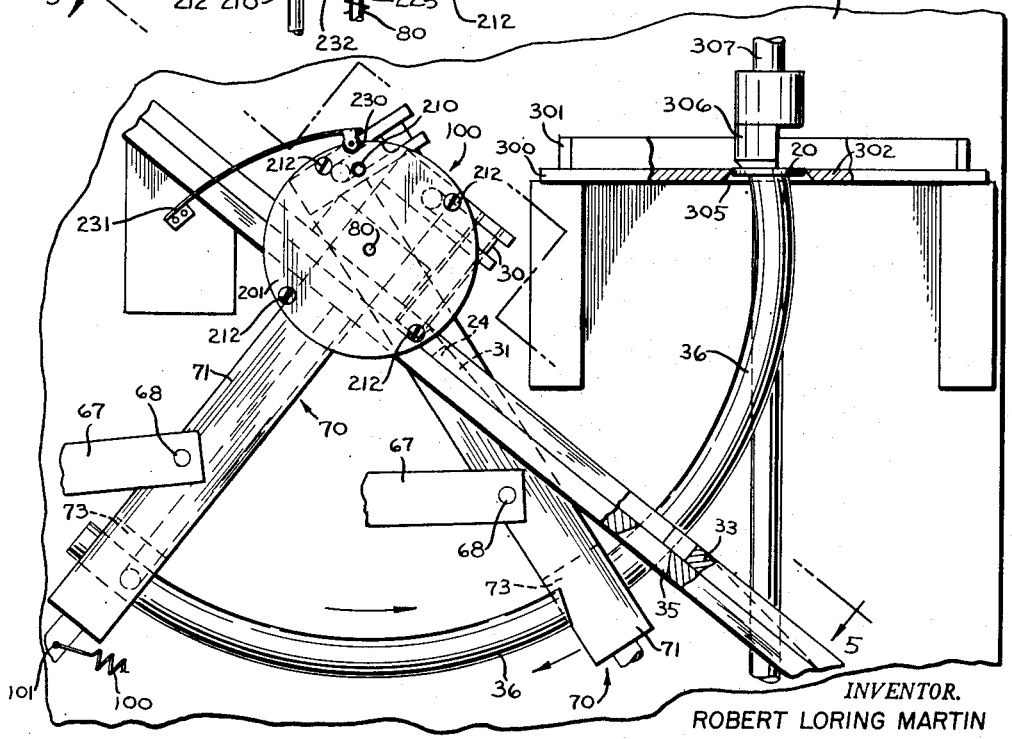
Figure 4 is an enlarged side view showing the yoke which carries the indexing and loading spindles, the indexing spindle being shown with a disc lifted up to be coated by the screen printing operation, the squeegee of the screen printing apparatus passing over the opening in the screen and being in the process of coating the disc.

The loading step 24 is also shown in Figures 4 and 5 wherein it is seen that the stopping edge 26 is angular so that it may position the disc 20 centrally of the track 22, 23 as the case may be, at appropriate position for engagement by the loading spindle 30.

Also, the top surface of the loading step 24 is angular or chamfered at 31 as shown particularly in Figure 4 so that the disc 20 may drop past the loading position readily.

Thereafter the disc 20 drops past the upper surface 31 of the loading step 24 sliding down the track 22 or 23 as the case may be until it reaches the indexing step 33 which is shaped and arranged so that it is similar to the loading step 24.

Each of the tracks 22 and 23 is provided with an opening 35 at a position registering with the disc 20 engaged by the stopping surface 26a of the indexing step 33, the said opening being arranged so that it will admit the arcuately shaped indexing spindle 36. The indexing spindle 36 for the track 23 is shown passed through the opening 35 in the said track.

After the discs 20 have been coated by the silk screen and squeegee apparatus indicated generally at 40 and hereinafter more particularly described, the discs drop beyond the upper surface of the indexing step 33 in each case sliding down the tracks 22 or 23, as the case may be, to the delivery point where they may then be picked up by a conveyor and passed through appropriate drying means and/or passed through a suitable inverter for passage through another machine or for passage through a track of the same machine for coating of the other side of the disc.

My machine is constructed so that all of the elements are supported on a base plate 41 and a vertical support plate 42 which may be provided with a bracket 43 in order to support the hopper 21.

A main drive motor 44 is mounted on a suitable support 45 carried by the base plate 41. The pulley 46 of the main drive motor 44 drives the belt 47 which in turn drives pulley 48 on shaft 49. Spiral gear 50 on shaft 49 drives the worm gear 51 on the main cam shaft 52.

The main cam shaft 52 carries at each outer end thereof the cams 54 and 55, cam 54 driving the appropriate loading and indexing apparatus for track 22 and cam 55 driving the appropriate loading and indexing apparatus for track 23.

The curvature of the cam surface 57 of each of the cams will hereinafter be more specifically described in connection with the operation thereof in controlling the position of the loading and indexing spindles 30 and 36 for each of the tracks.

Each of the cams 54 and 55 is provided with a cam follower 60 rotatably mounted on the end of the operating link 61. The operating link is arranged for longitudinal sliding movement in the guides 62 and 63 carried by the bracket 64 on each side of the machine.

The operating link 61 on each side is pivotally connected by pin 66 to one end of connecting link 67. The opposite end of the connecting link 67 is pivotally connected by pin 68 to the oscillating pivotally mounted yoke 70.

Each of the yokes 70 (see also Figure 6) comprises a pair of main supporting arms 71, 72 with a mounting block 73 carried between them at the lower end and the loader support block 74 carried between them at the upper end, the blocks 73 and 74 being integrated in any suitable manner with the vertical parallel arms 71 and 72 of the yoke.

Each of the yokes 70 is rotatably mounted on shaft 80 carried above the track 22 and 23, as the case may be, in any appropriate manner as, for instance, by lugs 81 extending from the lateral side guides 83 and 84 of each of the tracks at the point of mounting of the yokes.

The valve elements 100, hereinafter described, are also carried by the shaft 80. The cam follower 60 is held against the cam surface 57 by appropriate tension applied to each of the yokes 70 in order to ensure that the yokes 70 will follow the operation of the cam follower 60 as controlled by the curve 57 of the cam 54 or 55.

A tension spring 100 is connected to extension 101 of each of the yokes 70. The tension spring 100 passes around the guide roller 102 on each side and is connected to the lug 103 on the base 41. The tension spring 100 consequently draws each of the yokes 70 in a counterclockwise direction or toward the right with respect to Figure 2, this motion toward the right being resisted by the engagement of the cam follower 60 against the cam groove 57 of the cam 54 or 55 on each side, the said force being transmitted, of course, through the links 61 and 67.

Consequently, as the cam 54 or 55 rotates as shown in Figure 2, the yoke 70 may move from the left-hand position shown for the near yoke of Figure 2 to the right-hand position shown for the far yoke of Figure 2 in accordance with the rotation of the cam through 180° from the position of the near cam 54 in Figure 2 to the position of the far cam 55 of Figure 2.

The right-hand position of the yoke corresponds to the raised position of the indexing or serving spindle 36; the left-hand position corresponds to the lowered position of the indexing or serving spindle 36. The curvature 57 of the cam groove surface of the cam 54 or 55 is such that the cam will permit the yoke to move rapidly to the upward position where the serving or indexing spindle 36 is raised.

Thereafter the section 57a of the curve will permit the serving spindle 36 to remain in the up position for a predetermined period of time while the disc carried thereby is being coated by the squeegee operating through the screen in the screen printing apparatus 40 hereinafter described.

On further rotation of the cam in a clockwise direction, the serving or indexing spindle 36 moves down as controlled by the arrangement of cam groove 57 where it hesitates in its movement for a short period of time while the disc is above the indexing step 33 in order to obtain sufficient time for the disc to drop off the end of the serving spindle 36.

It will be seen from an examination particularly of Figure 6, although Figures 2, 3 and 4 should be referred to at the same time, that the loading spindle 30 is raised by the yoke 70 at the same time that the serving spindle 36 is raised.

However, since the serving spindle 36 is carried by the lower end of the yoke 70 and the loading spindle 30 is carried slightly above the center of rotation around shaft 80 for the yoke 70, the relative movement of the end 30 of the loading spindle is very small compared to the movement of the end of the serving spindle 36.

The serving spindle 36 is made in arcuate form only to enable the same to conform in its motion to the rotative movement of the yoke 70.

Actually, the function of the serving spindle 36 is to raise the disc 20 vertically against the screen printing apparatus 40. Thus, when the yoke 70 is moved toward the right, the loading spindle 30 engages the disc 20 which is retained by the loading step 24 and lifts the same above the level of the loading step 24 owing to the vacuum in the loading spindle 30.

When the loading spindle 30 rises above the step 24, the vacuum is released from the spindle at the appropriate time as hereinafter described and the disc drops down toward the indexing step 33. At this time, the indexing or serving spindle 36 is below the level of the track 22 or 23 as the case may be and has not yet entered the opening 35.

The serving spindle then enters the opening 35 on movement of the yoke 70 toward the right and owing to the vacuum in the serving spindle 36 raises the disc at that point up to the screen printing apparatus 40 which then applies the coating.

As the serving spindle 36 now moves down after the coating operation has been performed, it hesitates slightly in its downward movement.

As previously described owing to the conformation of the cam groove 57 of the cam 54 or 55 as the case may be and at the same time the vacuum is cut off, the interior of the serving spindle 36 is placed at atmospheric pressure and the disc now drops off past the indexing step 33 and slides down the track to the delivery point.

Thus, it will be seen that a vacuum should be applied to the loading spindle 30 when it engages the disc on the track at the loading step 26 and this vacuum should be released after the loading spindle 30 has raised the disc above the loading step 26.

Also, a vacuum should be applied to the serving spindle 36 just before it enters the opening 35 on its upward stroke and this vacuum should be maintained all during the upward position of the serving spindle 36 until the spindle begins to come down; the vacuum should then be released while the serving spindle 36 hesitates in its downward stroke owing to the curvature of the cam until the disc has had time to drop off past the indexing step 33.

This is accomplished by the valve structure 100 shown in detail in Figure 6. The valve structure comprises a two-piece valve element 200 comprising the discs 201 and 202 secured to it.

This two-piece element 200 is rotatably mounted on the shaft 80, a separate valve structure 100 being, of course, provided for each of the yokes. The two-piece element 200 engages with the single element 203 which is secured to and rotatable with the yoke.

The element 203 is essentially a smooth ground sealing surface having the opening 204 which communicates through passage 205 with the hollow interior of the loading spindle 30. The element 203 is also provided with the opening 207 which through passage 208 communicates with the interior of the serving spindle 36.

As it will now be understood, the lower end of the loading spindle 30 is open in order that a disc may be engaged and held by vacuum and also the upper end of serving spindle 36 is open in order that a disc may be engaged and held by vacuum.

The opposite ends of each of the spindles is, of course, closed except for its communication with the respective passages 205 and 208 which in turn communicate with openings 204 and 207 in the ground valve surface 203.

The composite valve element 200 consisting of discs 201, 202 is provided with a tube 210 which may be connected to any suitable vacuum source. The tube 210 communicates with the annular recess 211 in element 201 which recess 211 forms a vacuum chamber in the composite valve 200 when elements 201 and 202 are sealed in surface-to-surface relation. The elements 201 and 202 are interconnected in any suitable manner as by the screws 212 passing through appropriate openings 213 in element 201 and into tapped openings 214 in element 202, the seal being such that an appropriate vacuum may be maintained in the annular vacuum chamber 211.

The upper segment of element 202 is provided with a pair of arcuate passages 215 and 216, passage 216 cooperating with pin 216a on valve member 203 and passage 215 being so positioned that it may be moved across the opening 204 for passage 205 for the loading spindle 30.

The lower segment of element 202 of the composite valve 200 is provided with the through passage 217 so arranged that it will move past the opening 207 communicating with the passage 208 for the serving spindle 36.

Thus, a vacuum may be drawn in the loading spindle 30 when the passage 215 communicates with opening 204 for passage 205 of the loading spindle 30 and a vacuum may be drawn in the serving spindle 36 when the opening 217 communicates with opening 207 which is connected to passage 208 for the serving spindle 36.

Summarizing, the member 202 has two passages which communicate with the vacuum chamber 211 to the outside of the valve element 200 so that a vacuum may be established through passage 215 to opening 204 and through passage 217 to opening 27 for the loading spindle 30 and the serving spindle 36, respectively. The additional passage 216 is for the purpose of operating valve 200.

Thus, although valve 200 may be held by roller 230 in detents 232 and 233 so that it is stationary with respect to valve member 203, pin 216a in slot 216 will move the valve member 200 so that its detent 232 or 233 leaves the roller 230 at the appropriate time to maintain openings 217 and 207 in registry, openings 215 and 204 in registry and the venting recesses 220 and 221 in registry with openings 204 and 207, respectively, as required for the operation of the device.

In addition, the outer side, that is, the side of element 202 in engagement with valve surface 203 is provided with air relief openings 220 and 221 which do not communicate with the annular vacuum chamber 211.

The composite member 200 is mounted on the shaft 80 and is held in tight frictional engagement with the valve surface 203 by the compression spring 225 which is compressed between the outer or free flat side of element 201 of the composite unit 200 and the nut 226 mounted on the threaded end 227 of shaft 80, the said nut 226 being held in position by a set screw entering into the threaded opening 228.

Consequently, the valve element 200 tends to rotate with the valve surface 203 and is prevented from rotating therewith by roller 230 mounted on the leaf spring 231 engaging in detents 232 and 233.

As the yoke 70 rotates toward the right raising loading spindle 30 and serving spindle 36, opening 204 in valve element 203 is opposite the passage 215 and a vacuum is drawn therein. The valve element 200 is held stationary by the roller 230 on leaf spring 231 in detent 233. With the vacuum drawn in loading spindle 30, it is able to lift the disc.

On continued rotation of the yoke 70 to the right as the loading spindle 30 is fully raised, the opening 204 moves opposite the recess 220 and the vacuum in loading spindle 30 is released permitting the disc to drop down. Likewise on rotation of the yoke 70 to the right, also the opening 207 moves opposite the vacuum opening 217. Further rotation of the yoke 70 to the right carries the opening 207 around with the serving spindle 36 and also drags valve element 200 around in a counterclockwise direction moving the valve element 200 counterclockwise from the position where roller 230 and leaf spring 231 engages detent 233 to the position where it engages detent 232. This maintains the vacuum during the up position of serving spindle 36. Loading spindle 30 is at atmospheric pressure being vented to atmosphere through openings 205, 204 and 220.

On rotation of the yoke 70 to the left, the valve element 202 is carried back so that the roller 230 engages the second detent 233 but prior to this the opening 207 has registered with recess 221 to release the vacuum in serving spindle 36 while opening 204 has registered with opening 215 to cause vacuum in loading spindle 30 so that the discs may be picked up by spindle 30 when it reaches the extreme down position.

Summarizing the valve operation: starting with the extreme left or clockwise position of arm 71, opening 204 is in line with hole 215 thereby holding a disc on the loading spindle 30. Pin 216a is against the right (or clockwise end) of slot 216 and hole 207 for serving spindle 36 is in line with atmosphere recess 221. As arm 71 moves in a counterclockwise direction, pin 216a moves away from the right end of slot 216 while valve 200 is held by roller 230 in detent 233. Hole 207 moves from passage 221 to opening 217 just as the hollow serving spindle enters the bottom of the track; hole 204 for loading spindle 30 moves opposite atmosphere connected passage 220 and the disc then drops from loading spindle 30. Hole 207 moves to the extreme end of slot 217 at which time pin 216a is in contact with the counterclockwise or left end of slot 216. Serving spindle 36 is at about three-fourths of the full up position at this time. Pin 216a moving against the left end of slot 216 causes valve 200 to rotate counterclockwise moving detent 233 out of engagement with roller 230 and moving detent 232 into engagement with detent 232 as the serving spindle 36 moves to the full up position while the vacuum is maintained thereon.

On the return or clockwise stroke of arm 31, opening 207 moves back along slot 217 and then to atmosphere connected passage 221; at which time pin 216a engages the right ed of slot 216, at the same time opeing 204 for loading spindle 30 moves from passage 220 to opening 215; serving spindle 36 hesitates at this time above the indexing step to permit the disc carried thereby to drop off owing to the slight jar occassioned by the engagement of pin 216a with the right end of slot 216. Vacuum is now on in loading spindle 30 to enable it to pick up a disc. Thereafter pin 216a rotates valve 200 clockwise by its engagement with the right end of slot 216 and moves the detent 232 in valve 200 out of engagement with roller 230, rotating the valve 200 until detent 233 is engaged by roller 230. At this time arm 71 reverses its stroke and the cycle is repeated.

The squeezee shaft 307 and hence the squeegee 306 is driven in timed relation to the cams 54 and 55 on a one-to-one ratio by sprocket 320 on cam shaft 52 which through chain 321 drives sprocket 322 on shaft 323, said sprockets being in a one-to-one ratio. Shaft 323 through the one-to-one ratio bevel gears 324 and 325 drives shaft 326 which through the one-to-one ratio bevel gears 327 and 328 drives shaft 329 which in turn carries and drives gear 330 which meshes with gear 312 and is in one-to-one ratio therewith to drive the squeegee 306.

Shaft 307 is pressed down into engagement with the screen 302 by the compression spring 310, Figure 2, which surrounds the shaft 307 and bears between upper bearing 311 of shaft 307 and the gear 312 mounted on the shaft 307.

Squeezee 306 is cup shaped as shown in Figures 1 and 7, being so shaped at a point which will during the rotation thereof register with the opposite holes 305, 305 in the screen 302. The timed relationship between the angular position of the squeegee 306 and the cams 54 and 55 is such that the squeegee 306 will pass the hole 305 for the serving spindle of the particular cam when the serving spindle is in the fully raised position so that the coating material will be deposited through the opening 305 and stencil screen 302 on to the disc.

By this means therefore a simplified coating operation is achieved whereby capacitors of uniform capacitance will be obtained and whereby a single machine with single driving elements may operate on a plurality of tracks.

In the foregoing I have set forth certain preferred embodiments of the invention, it being understood, however, that the invention is not limited thereto as many variations will be readily apparent to those skilled in the art and the invention is to be given its broadest possible interpretation within the terms of the following claims.

I claim:

1. An automatic disc coating machine for coating a metallic material on an insulating disc; said machine comprising a pair of parallel inclined tracks; a succession of said discs being slidable down each of said tracks; a horizontal screen supported above said tracks; a continuously rotating squeegee operating over said screen; means on each track for halting each disc beneath said screen; means cooperable with each track for raising each disc against said screen; a stencil opening in said screen at the point engaged by each disc and located above each track; each disc being raised to said screen before said squeegee reaches said stencil opening, said raising means also lowering each of said discs after the squeegee passes said opening, means for releasing each disc from said raising means after the lowering operation and for dropping down said track past said halting means; and means for driving said squeegee and said raising means.

2. An automatic disc coating machine for coating a metallic material on an insulating disc; said machine comprising a track, a succession of said discs being slidable down said track; a horizontal screen supported above said track; a continuously rotating squeegee operating over said screen; means for halting each disc beneath said screen; means for raising said disc against said screen; a stencil opening in said screen at the point engaged by said disc; said disc being raised to said screen before said squeegee reaches said stencil opening, said raising means also lowering each of said discs after the squeegee passes said opening, means for releasing each disc from said raising means after the lowering operation and for dropping down said track past said halting means; and means for driving said squeegee and said raising means.

3. An automatic disc coating machine for coating a metallic material on an insulating disc; said machine comprising a plurality of inclined tracks; a succession of said discs being slidable down each of said tracks; a horizontal screen supported above said tracks; a continuously rotating squeegee operating over said screen; means on each track for halting each disc beneath said screen; means cooperable with each track for raising each disc against said screen; a stencil opening in said screen at the point engaged by each disc and located above each track; each disc being raised to said screen before said squeegee reaches said stencil opening, said raising means also lowering each of said discs after the squeegee passes said opening, means for releasing each disc from said raising means after the lowering operation and for dropping down said track past said halting means; and means for driving said squeegee and said raising means.

4. An automatic disc coating machine for coating a metallic material on an insulating disc; said machine comprising a plurality of inclined tracks; a succession of said discs being slidable down each of said tracks; a horizontal screen supported above said tracks; a continuously rotating squeegee operating over said screen; a loading step on each track halting successive discs; a loading spindle operable on each track at the loading step to raise the disc above the level of the step and to drop the disc down the track past the loading step; means on each track for halting each disc beneath said screen; means cooperable with each track for raising each disc against said screen; cam means operating said spindle and said raising means; a stencil opening in said screen at the point engaged by each disc and located above each track; each disc being raised to said screen before said squeegee reaches said stencil opening, said raising means also lowering each of said discs after the squeegee passes said opening, means for releasing each disc from said raising means after the lowering operation and for dropping down said track past said halting means; and means driving said cam means and said squeegee.

5. An automatic disc coating machine for coating a metallic material on an insulating disc; said machine comprising a plurality of inclined tracks; a succession of said discs being slidable down each of said tracks; a horizontal screen supported above said tracks; a continuously rotating squeegee operating over said screen; a loading step on each track halting successive disc; a loading spindle operable on each track at the loading step to raise the disc above the level of the step and to drop the disc down the track past the loading step; an indexing step on each track halting successive discs; a serving spindle operable on each track to raise the disc against the screen; a stencil opening in said screen at the point engaged by each disc and located above each track; each disc being raised to said screen before said squeegee reaches said stencil opening, said raising means also lowering each of said discs after the squeegee passes said opening, means for releasing each disc from said raising means after the lowering operation and for dropping down said track past said indexing step; and means driving said squeegee and operating said spindle in a predetermined sequence.

6. An automatic disc coating machine for coating a metallic material on an insulating disc; said machine comprising a track, a succession of said discs being slidable down said track; a horizontal screen supported above said track; a continuously rotating squeegee operating over said screen; a loading step on said track halting successive discs; a loading spindle operable on said track at the loading step to raise the disc above the level of the step and to drop the disc down the track past the loading step; means for halting each disc beneath said screen; cam means operating said spindle and said raising means; means for raising said disc against said screen; a stencil opening in said screen at the point engaged by said disc; said disc being raised to said screen before said squeegee reaches said stencil opening, said raising means also lowering each of said discs after the squeegee passes said opening, means for releasing each disc from said raising means after the lowering operation and for dropping down said track past said halting means; and means driving said cam means and said squeegee.

7. An automatic disc coating machine for coating a metallic material on an insulating disc; said machine comprising a track, a succession of said discs being slidable down said track; a horizontal screen supported above said track; a continuously rotating squeegee operating over said screen; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the screen; a stencil opening in said screen at the point engaged by said disc; said disc being raised to said screen before said squeegee reaches said stencil opening said spindle also lowering each of said discs after the squeegee passes said opening, means for releasing each disc from said spindle after the lowering operation and for dropping down said track past said indexing step, cam means operating said spindles in a predetermined time sequence; and means driving said cam means and said squeegee.

8. An automatic disc coating machine for coating a metallic material on an insulating disc; said machine comprising a track, a succession of said discs being slidable down said track; a horizontal screen supported above said track; a continuously rotating squeegee operating over said screen; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the screen; a stencil opening in said screen at the point engaged by said disc; said disc being raised to said screen before said squeegee reaches said stencil opening said spindle also lowering each of said discs after the squeegee passes said opening, means for releasing each disc from said spindle after the lowering operation and for dropping down said track past said indexing step; an opening in the track at the indexing step; the serving spindle being mounted below the track and being operable above the track through said opening, cam means operating said spindles in a predetermined time sequence; and means driving said cam means and said squeegee.

9. An automatic disc coating machine for coating a metallic material on an insulating disc; said machine comprising a track; a succession of said discs being slidable down said track; a horizontal screen supported above said track having at least one opening; a continuously rotating squeegee operating over said screen; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the screen; said disc being raised to said screen before said squeegee reaches said screen opening said spindle also lowering each of said discs after the squeegee passes said opening, means for releasing each disc from said spindle after the lowering operation and for dropping down said track past said indexing step; an opening in the track at the indexing step; the serving spindle being mounted below the track and being operable above the track through said opening; the loading spindle being mounted above the track, cam means operating said spindles in a predetermined time sequence; and means driving said cam means and said squeegee.

10. An automatic disc coating machine for coating a metallic material on an insulating disc; said machine comprising a track; a succession of said discs being slidable down said track; a horizontal screen supported above said track, said screen having at least one opening; a continuously rotating squeegee operating over said screen; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the screen; said disc being raised to said screen before said squeegee reaches said screen opening and being lowered after the squeegee passes said opening; said disc being thereafter released from said serving spindle and dropping down on the track past said indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke, and the serving spindle being carried at the lower end of the yoke; movement of the yoke in one direction raising both spindles and movement of the yoke in the other direction lowering both spindles; cam means operating said yokes and through said yokes said spindles in a predetermined time sequence; and means driving said cam means and said squeegee.

11. An automatic disc coating machine for coating a metallic material on an insulating disc; said machine comprising a track; a succession of said discs being slidable down said track; a horizontal screen supported above said track and having at least one opening; a continuously rotating squeegee operating over said screen; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the screen; said disc being raised to said screen before said squeegee reaches said screen opening and being lowered after the squeegee passes said opening; said disc being thereafter released from said serving spindle and dropping down on the track past said indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke, and the serving spindle being carried at the lower end of the yoke; movement of the yoke in one direction raising both spindles and movement of the yoke in the other direction lowering both spindles; cam means operating said yokes and through said yokes said spindles in a predetermined time sequence; and means driving said cam means and said squeegee.

12. An automatic disc coating machine for coating a metallic material on an insulating disc; said machine comprising a track; a succession of said discs being slidable down said track; a horizontal screen supported above said track and having at least one opening; a continuously rotating squeegee operating over said screen; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the screen; said disc being raised to said screen before said squeegee reaches said screen opening and being lowered after the squeegee passes said opening; said disc being thereafter released from said serving spindle and dropping down on the track past said indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke, and the serving spindle being carried at the lower end of the yoke; movement of the yoke in one direction raising both spindles and movement of the yoke in the other direction lowering both spindles; cam means for driving said yoke and said spindles and a connection between said cam and said squeegee for driving the squeegee in timed relation to the yoke.

13. An automatic disc coating machine for coating a metallic material on an insulating disc; said machine comprising a track; a succession of said discs being slidable down said track; a horizontal screen supported above said track and having at least one opening; a continuously rotating squeegee operating over said screen; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the screen; said disc being raised to said screen before said squeegee reaches said screen opening and being lowered after the squeegee passes said opening; said disc being thereafter released from said serving spindle and dropping down on the track past said indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke, and the serving spindle being carried at the lower end of the yoke; movement of the yoke in one direction raising both spindles and movement of the yoke in the other direction lowering both spindles; cam means for driving said yoke; a connection between said cam means and said squeegee for driving the squeegee in timed relation to the yoke; each spindle being open at the end of the spindle engageable with a disc; a vacuum source; and means connecting each of said spindles to said vacuum source.

14. An automatic disc coating machine for coating a metallic material on an insulating disc; said machine comprising a track; a succession of said discs being slidable down said track; a horizontal screen supported above said track and having at least one opening; a continuously rotating squeegee operating over said screen; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the screen; said disc being raised to said screen before said squeegee reaches said screen opening, and being lowered after the squeegee passes said opening; said disc being thereafter released from said serving spindle and dropping down on the track past said indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke, and the serving spindle being carried at the lower end of the yoke; movement of the yoke in one direction raising both spindles and movement of the yoke in the other direction lowering both spindles; cam means for driving said yoke; a connection between said cam means and said squeegee for driving the squeegee in timed relation to the yoke; each spindle being open at the end of the spindle engageable with a disc; a vacuum source; a valve member operated by said yoke in timed relation with the movement of said spindles; said valve connecting said loading spindle to said vacuum source just before the loading spindle reaches its lowest position and connecting said loading spindle to atmosphere when the loading spindle reaches the top of its stroke.

15. An automatic disc coating machine for coating a metallic material on an insulating disc; said machine comprising a track; a succession of said discs being slidable down said track; a horizontal screen supported above said track and having at least one opening; a continuously rotating squeegee operating over said screen; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the screen; said disc being raised to said screen before said squeegee reaches said screen opening and being lowered after the squeegee passes said opening; said disc being thereafter released from said serving spindle and dropping down on the track past said indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke, and the serving spindle being carried at the lower end of the yoke; movement of the yoke in one direction raising both spindles and movement of the yoke in the other direction lowering both spindles; cam means for driving said yoke; a connection between said cam means and said squeegee for driving the squeegee in timed relation to the yoke; each spindle being open at the end of the spindle engageable with a disc; a vacuum source; a valve member operated by said yoke in timed relation with the movement of said spindles; said valve connecting said loading spindle to said vacuum source just before the loading spindle reaches its lowest position and connecting said loading spindle to atmosphere when the loading spindle reaches the top of its stroke; said valve connecting said serving spindle to said vacuum source as the serving spindle starts to rise and connecting said serving spindle to atmosphere immediately after the serving spindle begins to move down.

16. An automatic disc coating machine for coating a metallic material on an insulating disc; said machine comprising a track; a succession of said discs being slidable down said track; a horizontal screen supported above said track and having at least one opening; a continuously rotating squeegee operating over said screen; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the screen; said disc being raised to said screen before said squeegee reaches said screen opening and being lowered after the squeegee passes said opening; said disc being thereafter released from said serving spindle and dropping down on the track past said indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke, and the serving spindle being carried at the lower end of the yoke; movement of the yoke in one direction raising both spindles and movement of the yoke in the other direction lowering both spindles; cam means for driving said yoke; a connection between said cam means and said squeegee for driving the squeegee in timed relation to the yoke; each spindle being open at the end of the spindle engageable with a disc; a vacuum source; means connecting each of said spindles to said vacuum source; a valve member for controlling said means to connect the loading and serving spindles to the vacuum source and the atmosphere to cause them to engage and disengage discs; said valve member being mounted on said yoke and being controlled by the oscillation of said yoke.

17. An automatic disc coating machine for coating a metallic material on an insulating disc; said machine comprising a track, a succession of said discs being slidable down said track; an applicator of metallic material located above said track; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the applicator; said disc being thereafter released from the serving spindle and dropping down on the track past the indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke; and the serving spindle being carried at the lower end of the yoke; movement of the yoke in one direction raising both spindles and movement of the yoke in the other direction lowering both spindles; and cam means driving said yoke.

18. An automatic disc coating machine for coating a metallic material on an insulating disc; said machine comprising a track, a succession of said discs being slidable down said track; an applicator of metallic material located above said track; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the applicator; said disc being thereafter released from the serving spindle and dropping down on the track past the indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke; and the serving spindle being carried at the lower end of the yoke; movement of the yoke in one direction raising both spindles and movement of the yoke in the other direction lowering both spindles; rotary cam means controlling the movement of said yoke; and a connection between said cam means and said applicator for driving the applicator in timed relation to the yoke.

19. An automatic disc coating machine for coating a metallic material on an insulating disc; said machine comprising a track, a succession of said discs being slidable down said track; an applicator of metallic material located above said track; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the applicator; said disc being thereafter released from the serving spindle and dropping down on the track past the indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke; and the serving spindle being carried at the lower end of the yoke; movement of the yoke in one direction raising both spindles and movement of the yoke in the other direction lowering both spindles; rotary cam means controlling the movement of said yoke; a connection between said cam means and said applicator for driving the applicator in timed relation to the yoke; each spindle being open at the end of the spindle engageable with a disc; a vacuum source; a valve member operated by said yoke in timed relation with the movement of said spindles; said valve connecting said loading spindle to said vacuum source just before the loading spindle reaches its lowest position and connecting said loading spindle to atmosphere when the loading spindle reaches the top of its stroke; said valve connecting said serving spindle to said vacuum source as the serving spindle starts to rise and connecting said serving spindle to atmosphere immediately after the serving spindle begins to move down.

20. An automatic disc coating machine for coating a metallic material on an insulating disc; said machine comprising a track, a succession of said discs being slidable down said track; an applicator of metallic material located above said track; a loading step on said track halting successive discs; a loading spindle operable on said track at the loading step to raise the disc above the level of the step and to drop the disc down the track past the loading step; an indexing step on said track halting successive discs; a serving spindle operable on said track to raise the disc against the applicator; said disc being thereafter released from the serving spindle and dropping down on the track past the indexing step; an opening in the track at the indexing step; the serving spindle being mounted below the track and being operable above the track through said opening; the loading spindle being mounted above the track; an oscillatable yoke extending below and above the track; said loading spindle being carried at the upper end of the yoke; and the serving spindle being carried at the lower end of the yoke; movement of the yoke in one direction raising both spindles and movement of the yoke in the other direction lowering both spindles; rotary cam means controlling the movement of said yoke; a connection between said cam means and said applicator for driving the applicator in timed relation to the yoke; each spindle being open at the end of the spindle engageable with a disc; a vacuum source; a valve member for controlling the connection of the loading and serving spindles to the vacuum source and the atmosphere to cause them to engage and disengage discs; said valve member being mounted on said yoke and being controlled by the oscillation of said yoke.

ROBERT LORING MARTIN.

No references cited.